United States Patent
Hayakawa et al.

(10) Patent No.: US 6,808,160 B2
(45) Date of Patent: Oct. 26, 2004

(54) SOLENOID VALVE

(75) Inventors: Hideyuki Hayakawa, Nishio (JP); Yozo Majima, Kariya (JP); Yuji Yabuki, Kariya (JP); Noriyuki Hosoi, Kariya (JP)

(73) Assignee: Advics Co., Ltd., Kariya (JP)

( * ) Notice: Subject to any disclaimer, the term of this patent is extended or adjusted under 35 U.S.C. 154(b) by 0 days.

(21) Appl. No.: 10/432,359

(22) PCT Filed: Aug. 8, 2002

(86) PCT No.: PCT/JP02/08150

§ 371 (c)(1),
(2), (4) Date: May 30, 2003

(87) PCT Pub. No.: WO03/016763

PCT Pub. Date: Feb. 27, 2003

(65) Prior Publication Data

US 2004/0026643 A1 Feb. 12, 2004

(30) Foreign Application Priority Data

Aug. 20, 2001 (JP) .................................... 2001-249420

(51) Int. Cl.⁷ ............................................. F16K 31/02
(52) U.S. Cl. ........................... 251/129.02; 251/129.15; 303/119.2
(58) Field of Search ................. 251/129.02, 129.15; 303/119.2

(56) References Cited

U.S. PATENT DOCUMENTS

| 6,189,983 B1 * | 2/2001 | Volz et al. ................ 303/119.2 |
| 6,254,199 B1 * | 7/2001 | Megerle et al. ........... 303/119.2 |
| 6,322,049 B1 * | 11/2001 | Hofmann et al. ...... 251/129.15 |
| 6,345,870 B1 * | 2/2002 | Linkner et al. ........... 303/119.2 |
| 6,364,430 B1 * | 4/2002 | Park ........................ 303/119.2 |
| 6,659,421 B1 * | 12/2003 | Goossens ................ 251/129.02 |
| 6,719,267 B2 * | 4/2004 | Torii et al. ............. 251/129.15 |

FOREIGN PATENT DOCUMENTS

| JP | U-50-154522 | 6/1974 |
| JP | A-H07-260029 | 10/1995 |
| JP | A-H09-119552 | 5/1997 |
| JP | A-H09-144929 | 6/1997 |
| JP | A-H10-038125 | 2/1998 |
| JP | A-H10-306883 | 11/1998 |

\* cited by examiner

*Primary Examiner*—John Bastianelli
(74) *Attorney, Agent, or Firm*—Posz & Bethards, PLC

(57) ABSTRACT

According to the present invention, a cylindrical member of a solenoid valve is provided with a protruding portion that protrudes in an axial direction of the cylindrical member. By fitting the protruding portion into a vertical groove of a plunger, it is possible to restrict the cylindrical member from moving in a peripheral direction of the plunger. Therefore, it is possible to prevent change of the flow path that passes the plunger and the vertical groove, as well as to prevent variation in a sliding speed of the plunger or the like. As a result, a fluid pulsation reduction effect is obtained.

8 Claims, 11 Drawing Sheets

RELATED ART

SOLENOID VALVE

CROSS REFERENCE TO RELATED APPLICATION

This application is based upon and claims the benefit of Japanese Patent Application No. 2001-249420 filed on Aug. 20, 2001, and PCT Application No. PCT/JP02/08150 filed on Aug. 8, 2002 the content of which are incorporated herein by reference.

FIELD OF THE INVENTION

The present invention relates to a solenoid valve for which opening and closing of a flow path is controlled by applying current to a coil. The present invention is preferably applied, for example, to a brake fluid pressure control valve disposed in a conduit of an ABS actuator provided in a vehicular braking apparatus.

RELATED ART OF THE INVENTION

FIG. 10 is across sectional view of a conventional solenoid valve J1. In the solenoid valve J1, when current is not applied to a coil J2, a plunger J4 is urged by elastic force of a spring J3, and a ball J6 provided at a tip of a shaft J5 that moves together with the plunger J4 separates from a valve seat J8 of a seat valve J7. Thus, a conduit A is in an opened state. When current is applied to the coil J2, the plunger J4 is urged in resistance to the elastic force of the spring J3, and the ball J6 provided at the tip of the shaft J5 is seated on the valve seat J8 of the seat valve J7. Accordingly, the conduit A is in a closed state. Further, a vertical groove J9 that is parallel with a sliding direction of the plunger J4 is formed on the outer periphery of the plunger J4. Movement of fluid through the vertical groove J9 facilitates sliding of the plunger J4.

In the type of solenoid valve J1, when the conduit A is opened and closed quickly, fluid pulsation becomes more substantial and thus problems such as an abnormal noise occur. Accordingly, a groove portion J10 is provided on an outer periphery of the plunger J4, and a ring shaped member J11 made of a resin is disposed in the groove portion J10. An orifice (fluid throttle) J12 that communicates with the vertical groove J9 is provided in the groove portion J10, and thus, a sliding speed of the plunger J4 becomes slower and a fluid pulsation reduction effect is obtained.

In the above mentioned configuration, since the ring shaped member J11 is assembled arbitrarily, there are cases in which relative displacement of the orifice J12 and the vertical groove J9 is generated, making it difficult to ensure a flow path. Therefore, in order to ensure the flow path, a chamfered portion J13 is provided such that a side wall face of the groove portion J10 is tapered, and the fluid is allowed to pass through the chamfered portion J13.

In the aforementioned conventional solenoid valve J1, relative displacement of the orifice J12 and the vertical groove J9 is generated by arbitrary assembly of the ring shaped member J11. The relative displacement, as shown in FIGS. 11A and 11B, changes the flow path (as shown by arrows in the drawing) of the fluid that passes the orifice J12 and the vertical groove J9, causing variation in flow path resistance. In such a case, variation in the sliding speed, or the like, of the plunger J4 occurs, and thus it is no longer possible to obtain sufficient fluid pulsation reduction effect.

Moreover, if the flow path is ensured by providing the chamfered portion J13 on the groove portion J10, a cross sectional area D of a portion of the plunger J4 at which the chamfered portion J13 is provided becomes smaller. Accordingly, attraction force is reduced.

Further, assembly of the ring shaped member J11 to the plunger J4 is executed by press-expanding the ring shaped member J11 using a bias cut portion (a cut-through portion), not shown, which is formed in the ring shaped member J11. However, fluid leaks through the bias cut portion, and thus the sliding speed of the plunger J4. deviates from a required set value.

DISCLOSURE OF THE INVENTION

It is therefore an object of the present invention to provide a solenoid valve that is capable of obviating the above problems.

It is an object of the present invention to eliminate variation in the flow path resistance caused by arbitrary assembly of a ring shaped member having an orifice, and to ensure sufficient fluid pulsation reduction effect.

It is further object of the present invention to ensure a cross sectional area of a plunger to prevent decrease in attraction force.

Moreover, it is object of the present invention to prevent fluid leakage through a bias cut portion.

According to the present invention, a solenoid valve includes a vertical groove formed along a sliding direction of a plunger, a groove portion that is formed around an outer periphery of the plunger are provided on an outer peripheral surface of the plunger, a cylindrical member provided with a communication path having an orifice that allows fluid to move in a sliding direction of the plunger is fitted into the groove portion, a positioning portion restricting movement of the cylindrical member in a peripheral direction of the plunger is provided in at least one of the plunger and the cylindrical member, and the cylindrical member is assembled to the plunger such that the positioning portion aligns the vertical groove with the communication path having the orifice.

Accordingly, the positioning portion is able to align the vertical groove with the communication path formed by the orifice. Therefore, it is possible to prevent change of flow path that passes the orifice and the vertical groove of the plunger, and variation in a sliding speed of the plunger. As a result, it is possible to obtain sufficient fluid pulsation reduction effect.

A solenoid valve according to the present invention may be provided with, for example, a protruding portion that protrudes in an axial direction of the cylindrical member at a portion of the cylindrical member where the orifice is formed. This protruding portion serves as the positioning portion. By fitting the protruding portion into the vertical groove, it is possible to align the vertical groove with the communication path having the orifice.

Alternatively, a solenoid valve according to the present invention may be provided with a protruding portion that protrudes in a radial direction of the cylindrical member at an inner peripheral surface of the cylindrical member. The protruding portion serves as the positioning portion. A concave portion into which the protruding portion is fitted is provided in the groove portion. By fitting the protruding portion into the concave portion, it is possible to align the vertical groove and the communication path having the orifice.

A solenoid valve according to the present invention may be characterized in that a bias cut portion formed by a cut-through portion that divides the cylindrical member is formed in the cylindrical member. This bias cut portion is formed in a shape that inclines toward with respect to the axial direction of the cylindrical member. Such a construction allows the bias cut portion to be lengthened, and thus a flow resistance of the fluid becomes larger at the bias cut portion. Therefore, it is possible to inhibit fluid leakage through the bias cut portion.

A solenoid valve according to the present invention may be characterized in that a bias cut portion formed by a cut-through portion that divides the cylindrical member is formed in the cylindrical member. The bias cut portion is formed in a stepped shape having a portion that is parallel with a peripheral direction of the cylindrical member. In such a construction, even if the cylindrical member expands in the radial direction, the portion parallel with the peripheral direction of the cylindrical member of the bias cut portion shuts off the flow path at the bias cut portion. Accordingly, it is possible to prevent fluid leakage through the bias cut portion.

A solenoid valve according to the present invention may be characterized in that a side wall face of the groove portion of the plunger is not chamfered. In this case, however, some cases where chamfering of approx. 0.1 to 0.2 mm is allowed to remove burrs, or the like. Accordingly, it is possible to ensure a large cross sectional area of the plunger and prevent decrease in attraction force.

A solenoid valve according to the present invention may be characterized in that the orifice and a portion having a larger flow path area than the orifice are disposed in series along a flow direction of the fluid in the communication path having the orifice.

Accordingly, the orifice is shorter and dimensional accuracy in processing is improved, thereby reducing variation in the flow path resistance.

It should be noted that the above reference numerals in parentheses indicate individual portions. These reference numerals correspond with specific portions to be described in the later embodiments.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE EMBODIMENTS

Figure 1:
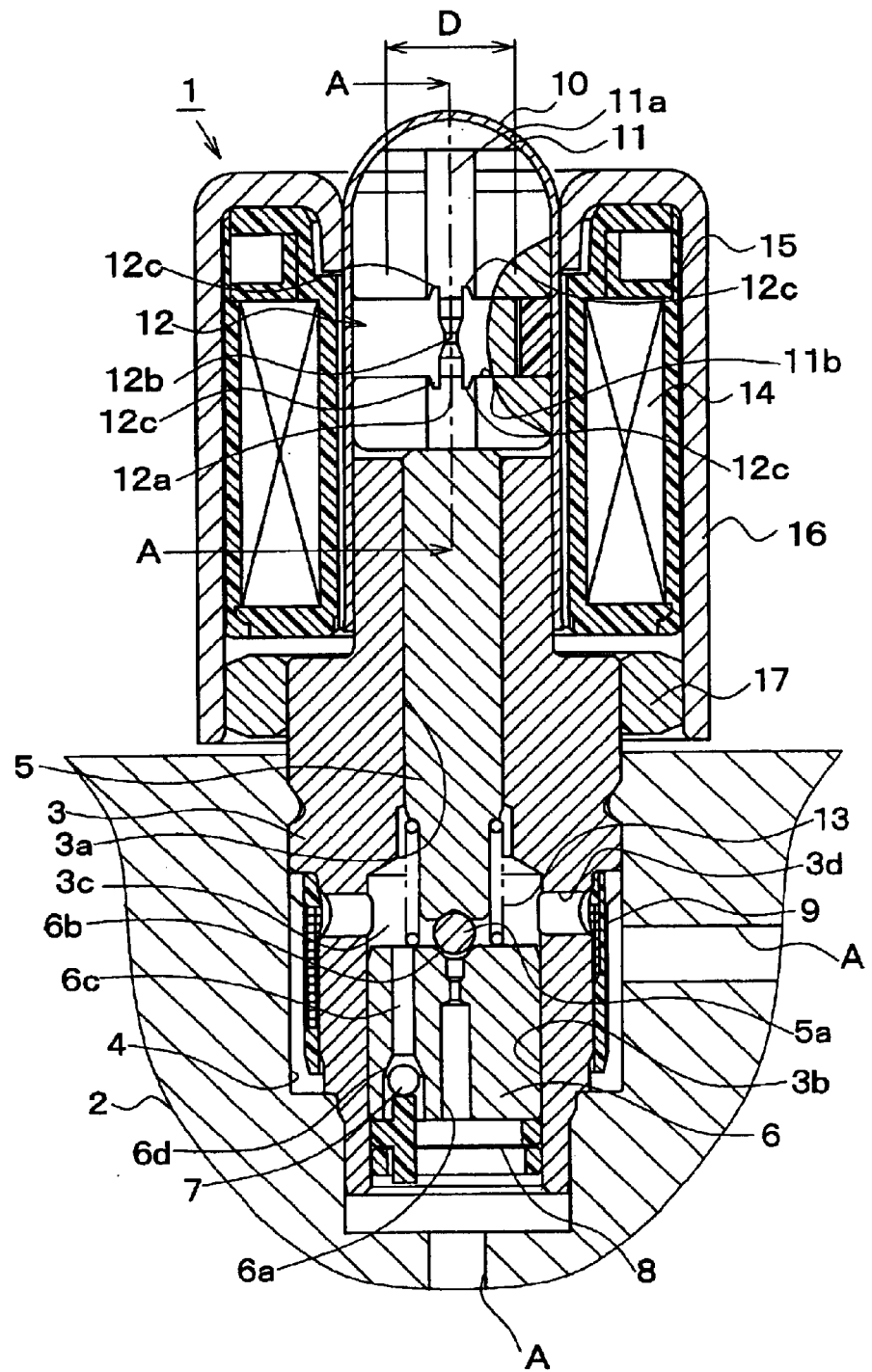
FIG. 1 is a cross sectional view of a solenoid valve 1 according to a first embodiment of the present invention.
Figure 2:
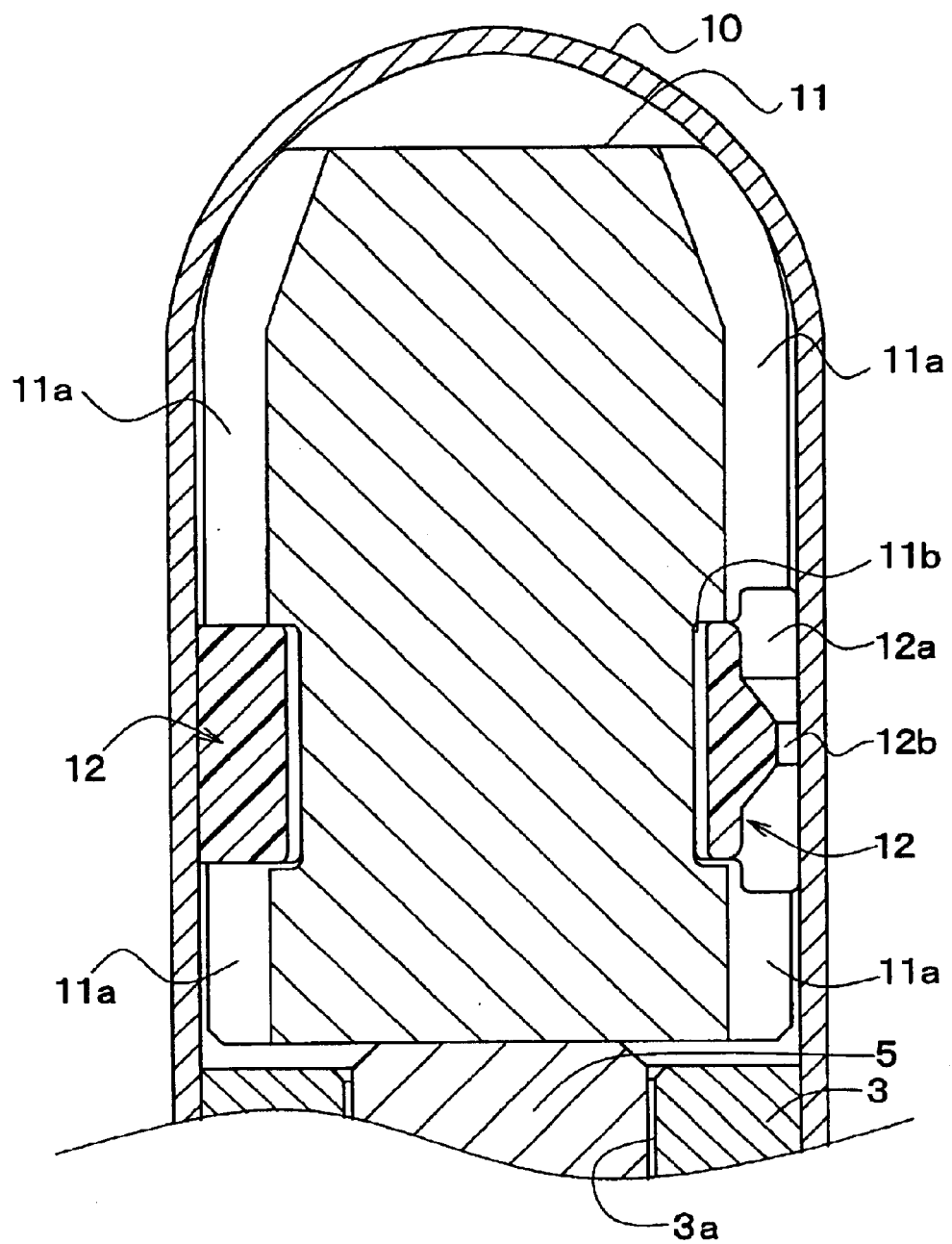
FIG. 2 is an enlarged view of a vicinity portion of a cylindrical member 12 of FIG. 1.

The present invention will be described further with reference to various embodiments in the drawings.
First Embodiment FIG. 1 is a cross sectional view of a solenoid valve 1 according to a first embodiment of the present invention, and FIG. 2 is a sectional view taken along line A—A of FIG. 1. The solenoid valve 1 is, for example, disposed in a conduit A for a brake fluid formed in a housing 2 of an TABS actuator. FIG. 1 shows a state when normal braking is executed, that is, a state in which current is not applied to a coil.

As shown in FIG. 1, the solenoid valve 1 is provided with a guide 3 made of a magnetic material. The guide 3 is formed in a stepped cylindrical shape such that a large diameter portion side of the guide 3 is fitted into a concave portion 4 of the housing 2 of the TABS actuator. Further, a part of the housing 2 is fitted into a recess provided in the guide 3 by deforming the vicinity of an opening end of the concave portion 4 of the housing 2, and thus the guide 3 is fixed to the housing 2.

The guide 3 includes a guide hole 3a that is positioned at a small diameter side of the guide 3 and holds a shaft 5 slidably, a seat insertion hole 3b that is positioned at a large diameter side of the guide 3 and into which a seat valve 6 is pressed, and a communication hole 3d for communicating a space 3c surrounded by the seat valve 6 and the seat insertion hole 3b with the conduit A formed in the housing 2.

The shaft 5 is formed of non-magnetic metal (such as stainless steel). The shaft 5 is shaped so as to be cylindrical, and an end portion thereof at the side of the seat valve 6 protrudes and extends from the guide hole 3a into the space 3c. A ball (valve body) 5a is welded to the tip of the end portion.

The seat valve 6 is formed in a cylindrical shape. A first communication path 6a is formed at a central portion in a radial direction of the seat valve 6 for communicating the space 3c in the guide 3 to the conduit A formed in the housing 2. Further, a tapered first valve seat 6b, which the ball 5a of the shaft 5 seats on and separates from, is formed at an end portion of the first communication path 6a on the side of the space. Moreover, a second communication path 6c for communicating the space 3c in the guide 3 to the conduit A is formed in parallel with the first communication path 6a in the seat valve. A tapered second valve seat 6d which a spherical check valve 7 seats on and separates from is formed in the second communication path 6c, at an end portion on the opposite side to the shaft 5.

The check valve 7 is held at a position opposite to the second valve seat 6d by a filter 8 pressed into a side of an end portion of the seat insertion hole 3b of the guide 3. A filter 9 is also disposed on an outer periphery of the large diameter portion of the guide 3 so as to surround the communication path 3d. The filters 8 and 9 prevent foreign matter mixed within the fluid from entering the solenoid valve 1.

An outer peripheral side of a small diameter portion of the guide 3 is fitted into a sleeve 10. The sleeve 10, made of non-magnetic metal (e.g., stainless steel), is formed in a cup-like shape having a cylindrical portion with one end that is open. A bottom face thereof is substantially spherical. A substantially cylindrical plunger 11 made of a non-magnetic material is disposed at a side of the bottom face of the sleeve 10, and the plunger 11 is slidable in the sleeve 10. The plunger 11 contacts the bottom face of the sleeve 10. When the plunger 11 contacts with the bottom face of the sleeve 10, a sliding movement of the plunger 11 in a direction toward the upper side of the drawing is restricted.

A vertical groove 11a that is parallel with a sliding direction of the plunger 11 is formed on an outer peripheral surface of the plunger 11. Movement of the fluid through the vertical groove 11a enables the plunger 11 to easily slide in the sleeve 10. A groove portion 11b running around the outer periphery of the plunger 11 is formed on an outer peripheral surface. A side wall face of the groove portion 11b is not chamfered, or, if it is slightly chamfered so that chamfering is only performed to a small portion. The cylindrical member 12 is disposed in the groove portion 11b.

Figure 3A:
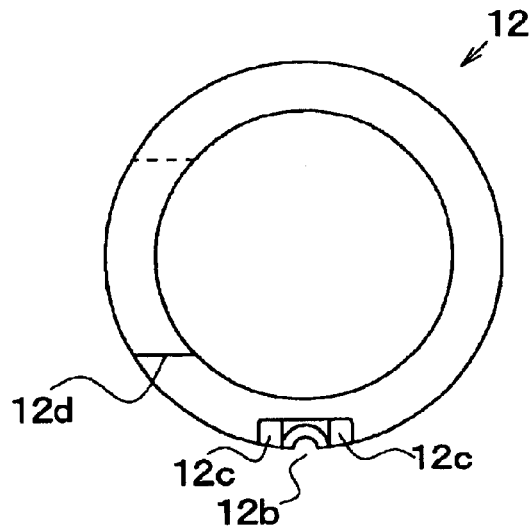
FIG. 3A is a top view of the cylindrical member 12.
Figures 3B, 3C:
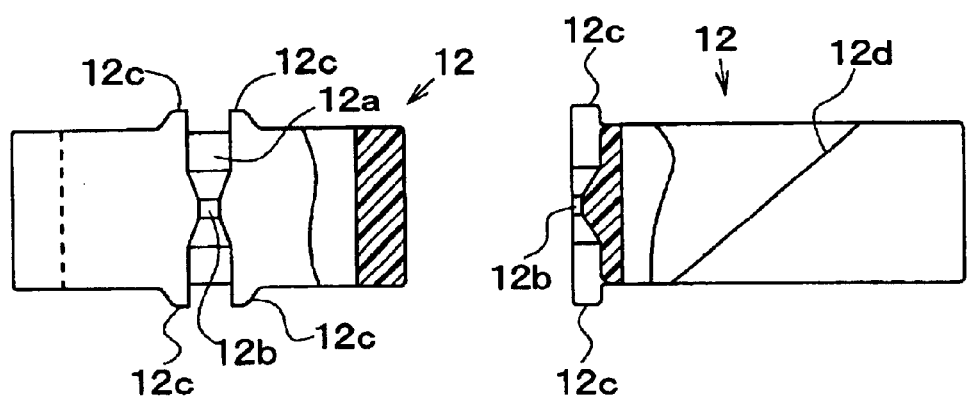
FIG. 3B is a partial cross sectional view of the cylindrical member 12 viewed from the front.
FIG. 3C is a partial cross sectional view of the cylindrical member 12 viewed from the right side of FIG. 3B.

FIGS. 3A–3C are a schematic views of the cylindrical member 12. FIG. 3A is a top view of the cylindrical member 12 (viewed from a top of FIG. 1). FIG. 3B is a partial cross sectional view of the cylindrical member 12 viewed from the front, and FIG. 3C is a partial cross sectional view of the cylindrical member 12 viewed from the right side of FIG. 3B.

The cylindrical member 12 has a substantially rectangular cross-section when cut along an axial direction of the plunger 11. The cylindrical member 12 is thin in a radial direction, and thick in an axial direction (i.e. a sliding direction of the plunger 11). Moreover, a longitudinal direction of the cylindrical member 12 is along with the sliding direction of the plunger 11.

The cylindrical member 12 is made of a resin with a large coefficient of linear expansion such as $10 \times 10^{-5}/°$ C. or more. The cylindrical member 12 is provided with a communication path 12a that is parallel with a movement direction of the plunger 11, and an orifice 12b disposed in the communication path 12a. The orifice 12b restricts an amount of the fluid that flows through the communication path 12a.

More specifically, the orifice 12b and a portion having a larger flow path area than the orifice 12b are disposed in series in the communication path 12a of the cylindrical member 12. Accordingly, the orifice 12b is made shorter and dimensional accuracy during processing of the orifice 12b is improved, thereby reducing variation in the flow path resistance.

The cylindrical member 12 is provided with protruding portions 12c that protrude at both sides in the axial direction. The protruding portions 12c are formed on both sides of the flow path which is formed by the orifice 12b, and this pair of protruding portions are fitted into the vertical groove 11a of the plunger 11. The width of the pair of protruding portions 12c, on respective sides, is the same as the width of the vertical groove 11a, and fitting of the pair of protruding portions 12c into the vertical groove 11a defines positioning of the orifice 12b and the vertical groove 11a. Accordingly, the vertical groove 11a is aligned with the communication path 12a formed by the orifice 12b.

Moreover, at a high temperature the cylindrical member 12 has the same length in the sliding direction of the plunger 11 as the groove portion 11b. At a low temperature, length of the cylindrical member 12 is smaller than that of the groove portion 11b. Specifically, it has been confirmed that an amount of gap created between the cylindrical member 12 and the groove portion 11b in the sliding direction of the plunger 11 is proportional to a response time of the solenoid valve 1. Thus, the lengths of the cylindrical member 12 and the groove portion 11b are set such that, at the low temperature, the amount of gap created between the cylindrical member 12 and the groove portion 11b is equal to an amount of gap according with a required response time of the solenoid valve 1.

Further, as shown in FIG. 3C, a bias cut portion 12d for dividing the cylindrical member 12 is formed in the cylindrical member 12, at a position which is different to the position at which the orifice 12b is formed. By pressexpanding the cylindrical member 12 with the bias cut portion 12d, the cylindrical member 12 can be fitted into the groove portion 11b. The bias cut portion 12d is formed as a cut-through portion that is inclined with respect to the axial direction of the cylindrical member 12. It is formed so as to be longer than in the case the bias cut portion is formed in parallel with the sliding direction of the plunger 11.

The shaft 5 is urged to the plunger 11 side by a spring 13 disposed between the shaft 5 and the seat valve 6, and the shaft 5 always abuts against the plunger 11 so as to operate integrally. Note that the shaft 5 and the plunger 11 configure movable members that move based on whether or not current is applied to a coil 1.

A cylindrical spool 15 is disposed around the sleeve 10, and houses the coil 14 that creates a magnetic field when current is applied. The spool 15, made of a resin (such as nylon), is formed by performing a secondary molding subsequent to attaching the coil 14 following a primary molding. A yoke 16 with a cup-like shape made of a magnetic material is formed on the outer periphery of the spool 15, and the yoke 16 houses the spool 15 and the coil 14. An opening portion is formed at a central portion of the bottom face of the yoke 16, and the bottom face side of the sleeve 10 is fitted into the opening portion. Terminals, not shown, are retracted from the coil 14. Current can be applied to the coil 14 through the terminals.

At an inlet side of the yoke 16, a ring shaped positioning member 17 is disposed between the yoke 16 and the large diameter portion of the guide 3 for positioning the yoke 16 and the guide 3.

Next, operation of the solenoid valve 1 with the aforementioned configuration will be described. As mentioned above, FIG. 1 shows a state of the solenoid valve 1 when current is not applied to the coil 14. As shown in FIG. 1, when current is not applied to the coil 14, the shaft 5 and the plunger 11 are urged toward the side of the bottom face of the sleeve 10 by elastic force of the spring 13, such that the plunger 11 contacts the bottom face of the sleeve 10. Then, the ball 5a of the shaft 5 separates from the first valve seat 6b of the seat valve 6, and the conduit A is in a communication state (opened state) through the first communication path 6a, the space 3c in the guide 3, and the communication hole 3d of the guide 3. Therefore, the solenoid valve 1 is in a communication state when current is not applied to the coil 14.

On the other hand, when current is applied to the coil 14, a magnetic field is created by the coil 14, and a magnetic path is formed by the guide 3, the plunger 11, the yoke 16 and the ring member 17. Next, the plunger 11 is attracted toward the guide 3 side by magnetic attraction force, and thus the shaft 5 and the plunger 11 are moved toward the side of the seat valve 6 resisting the spring 13. Accordingly, the ball 5a of the shaft 5 is seated on the first valve seat 6b of the seat valve 6 and the solenoid valve 1 is placed in a shut-off state (closed state).

During opening and closing operation of the solenoid valve 1, when the temperature is normal to high, the amount of a gap between the cylindrical member 12 and the groove portion 11b of the plunger 11 in the sliding direction of the plunger 11 is substantially zero. Therefore, sliding speed of the plunger is reduced due to a throttling effect of the orifice 12b formed in the cylindrical member 12. Accordingly, it is possible to slow down the opening and closing operation of the conduit A (flow path) by the solenoid valve 1, and a fluid pulsation reduction effect is obtained.

On the contrary, when the temperature is low, the gap is increased between the cylindrical member 12 and the groove portion 11b of the plunger 11 in the sliding direction. Therefore, even if viscous resistance of the fluid at a low temperature is larger than that at a normal temperature, the plunger 11 slides easily. Accordingly, the opening and closing operation of the conduit A by the solenoid valve 1 is performed at a desired slow speed, that is, the operation is not executed too slowly. As a result, responsiveness at a low temperature can be enhanced.

When performing such the operation with the solenoid valve 1 according to the present embodiment, the protruding portions 12c provided in the cylindrical member 12 act as a positioning portion so as to align the vertical groove 11a with the communication path 12a formed by the orifice 12b. Accordingly, of the flow path that passes through the orifice 12b and the vertical groove 11a of the plunger 11 is not changed, and it is possible to decrease variation in a sliding speed, or the like of the plunger 11. As a result, sufficient fluid pulsation reduction effect is obtained.

Figure 4:
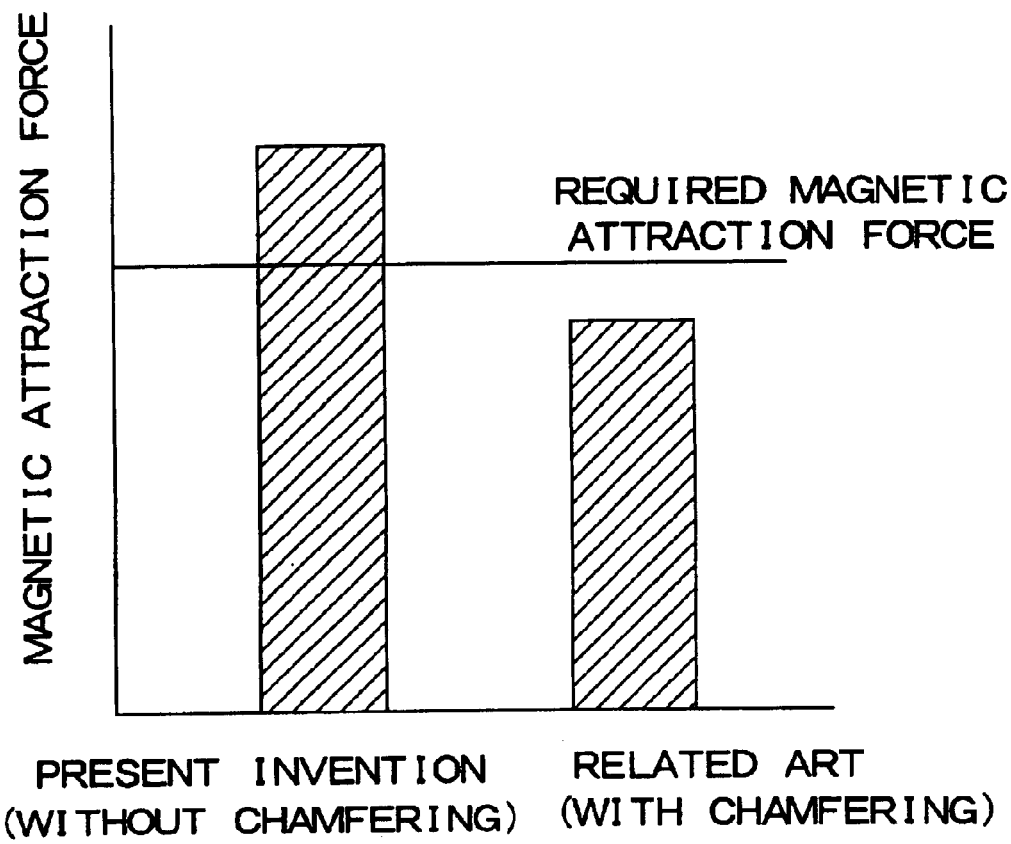
FIG. 4 is a bar graph comparing a magnetic force of the solenoid valve 1 according to the first embodiment of the present invention and that of a related art solenoid valve J1.

According to the present embodiment, the sidewall face of the groove portion 11b formed in the plunger 11 is not chamfered, or, if it is slightly chamfered so that chamfering is only performed to a small portion. This is achieved because the orifice 12b is aligned with the vertical groove 11a as mentioned above, and thus the fluid reliably flows through the orifice 12b even if chamfering is hardly formed at all. This construction ensures a large cross sectional area D of the plunger 11. FIG. 4 shows a result of a comparison between magnetic attraction forces of the solenoid valve 1 according to the present embodiment and that of the related art chamfered solenoid valve J1. As is apparent from the result, the solenoid valve 1 according to the present embodiment satisfies a required attraction force, thereby preventing decrease in magnetic attraction force.

Moreover, since the cylindrical member 12 is formed so as to be wide according to the present embodiment, it is possible to ensure that the bias cut portion 12d is long. Accordingly, flow resistance of the fluid increases through the bias cut portion 12d and fluid leakage through the bias cut portion 12d is therefore inhibited. Since the groove portion 11b is not chamfered substantially, only minimal fluid flow to the bias cut portion 12d through the chamfered portion is possible. Therefore, fluid leakage through the bias cut portion 12d is further inhibited.

Moreover, since the cylindrical member 12 is thin in the radial direction, flexural rigidity of the cylindrical member 12 is small. Therefore, when the fluid pressure, which is generated during the plunger 11 slides, acts on the inner peripheral surface side of the cylindrical member 12, the cylindrical member 12 is easily deformed such that the outer peripheral surface of the cylindrical member 12 contacts the inner peripheral surface of the sleeve 10. Accordingly, the boundary of these two members is reliably sealed.

If the cylindrical member 12 is made of nylon 6T, polytetrafluoroethylene, or the like, which has low water absorbing properties, it is possible to reduce the change in outside dimensions to a minimum, and reduce the difference in diameter of the cylinder member 12 from the inner diameter of the sleeve 10. Therefore, leakage from the bias cut portion 12d is further reduced.

Second Embodiment

Figure 5A:
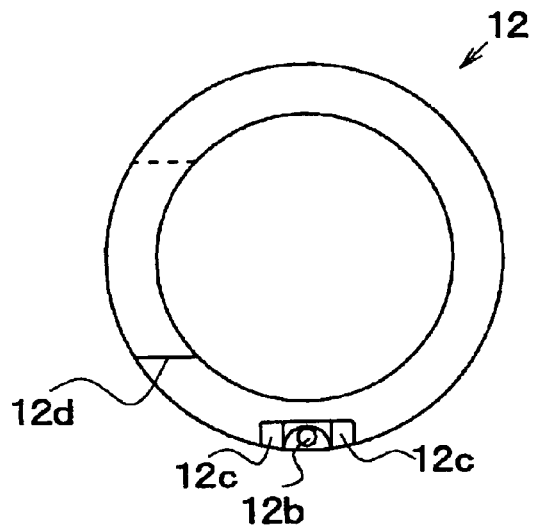
FIG. 5A is a top view of the cylindrical member 12.
Figure 5B:
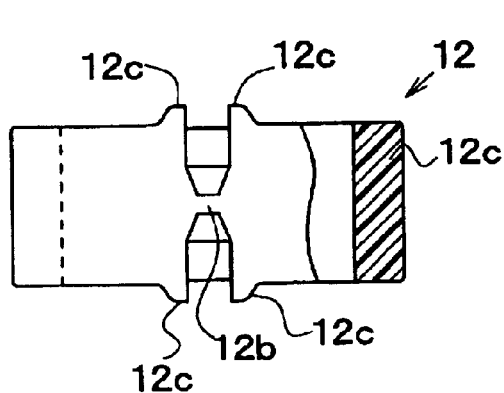
FIG. 5B is a partial cross sectional view of the cylindrical member 12 viewed from the front.
Figure 5C:
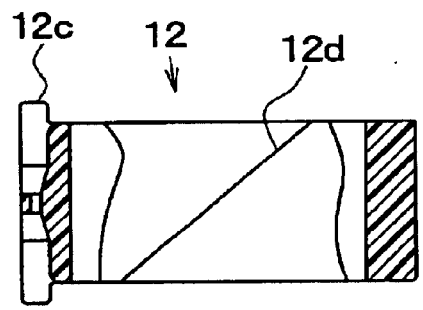
FIG. 5C is a partial cross sectional view of the cylindrical member 12 viewed from the right side of FIG. 5B.

FIGS. 5A–5C are schematic views of the cylindrical member 12 according to a second embodiment of the present invention. FIG. 5A is a top view of the cylindrical member 12. FIG. 5B is a partial cross sectional view of the cylindrical member 12 viewed from the front. FIG. 5C is a partial cross sectional view of the cylindrical member 12 viewed from the right side of FIG. 5B. The second embodiment only differs from the first embodiment in that the cylindrical member 12 has been modified. Since other elements of the solenoid valve 1 are the same as in the first embodiment, only a portion which is different will be described.

In the first embodiment, the orifice 12b is formed by the partially narrowed communication path 12a which is formed in a groove-like shape on the outer peripheral surface of the cylindrical member 12. On the contrary, according to the second embodiment, the orifice 12b is formed by partially drilling the cylindrical member 12. According to the second embodiment in which the orifice 12b is formed by drilling, an effect is obtained that is similar to that of the first embodiment.

Third Embodiment

Figure 6A:
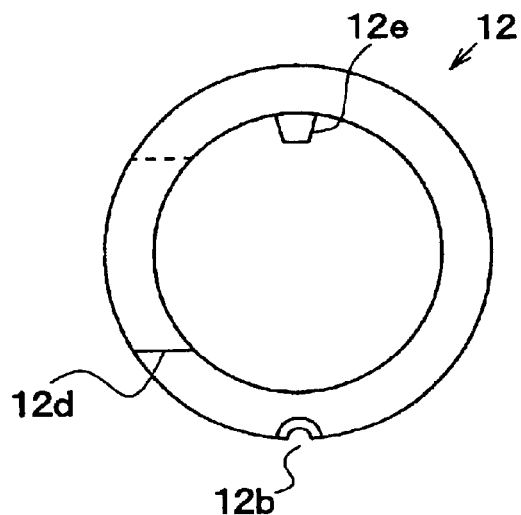
FIG. 6A is a top view of the cylindrical member 12.
Figure 6B:
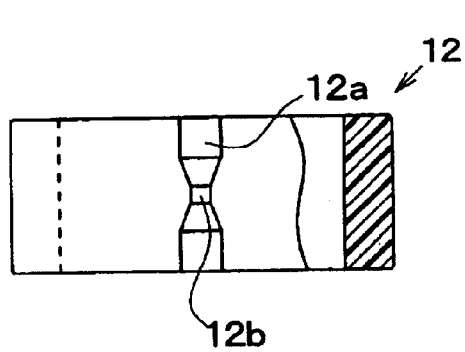
FIG. 6B is a partial cross sectional view of the cylindrical member 12 viewed from the front.
Figure 6C:
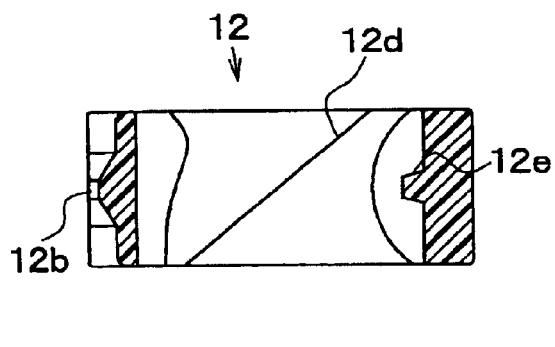
FIG. 6C is a partial cross sectional view of the cylindrical member 12 viewed the right side of FIG. 6B.

FIGS. 6A–6C are schematic views of the cylindrical member 12 according to a third embodiment of the present invention. FIG. 6A is a top view of the cylindrical member 12. FIG. 6B is a partial cross sectional view of the cylindrical member 12 viewed from the front. FIG. 6C is a partial cross sectional view of the cylindrical member 12 viewed from the right side of FIG. 6B. The third embodiment only differs from the first embodiment in that the cylindrical member 12 has been modified. Since other elements of the solenoid valve 1 are the same as in the first embodiment, only a portion which is different will be described.

In the first embodiment, the cylindrical member 12 and the plunger 11 are positioned by the protruding portions 12c that protrude at both sides in the axial direction of the cylindrical member 12. On the contrary, according to the third embodiment, a concave portion is formed in the groove portion 11b of the plunger 11, and the cylindrical member 12 and the plunger 11 are positioned by fitting a protruding portion 12e protruding in the radial direction from the inner diameter side of the cylindrical member 12 into the concave portion in the groove portion 11b.

The above configuration also aligns the communication path 12a of the cylindrical member 12 with the vertical groove 11a of the plunger 11. Accordingly, an effect is obtained that is similar to that of the first embodiment.

Fourth embodiment

Figure 7A:
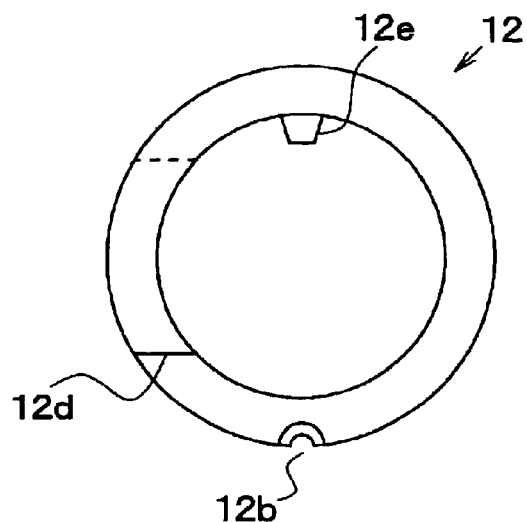
FIG. 7A is a top view of the cylindrical member 12.
Figure 7B:
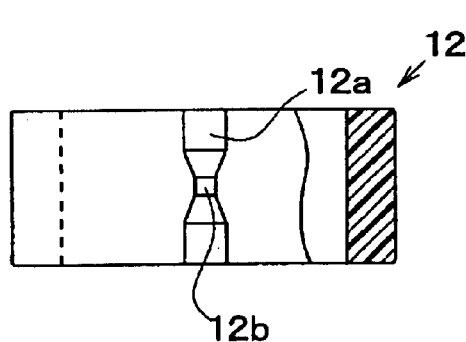
FIG. 7B is a partial cross sectional view of the cylindrical member 12 viewed from the front.
Figure 7C:
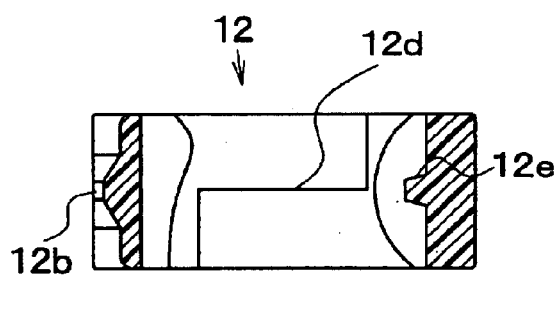
FIG. 7C is a partial cross sectional view of the cylindrical member 12 viewed from the right side of FIG. 7B.

FIGS. 7A–7C are schematic views of the cylindrical member 12 according to a fourth embodiment of the present invention. FIG. 7A is a top view of the cylindrical member 12. FIG. 7B is a partial cross sectional view of the cylindrical member 12 viewed from the front. FIG. 7C is a partial cross sectional view of the cylindrical member 12 viewed from the right side of FIG. 7B. Since the fourth embodiment only differs from the first embodiment in that the cylindrical member 12 has been modified. Since other elements of the solenoid valve 1 are the same as in the first embodiment, only a portion which is different will be described.

According to the first embodiment described above, the bias cut portion 12d is inclined with respect to the axial direction of the cylindrical member 12. On the contrary, according to the fourth embodiment, the bias cut portion 12d is formed in a stepped shape constituted by portions that are parallel with the axial direction of the cylindrical member 12 and a portion parallel with a peripheral direction of the cylindrical member 12.

Accordingly, even if the cylindrical portion 12 expands in the radial direction, the portion of the bias cut portion 12d that is parallel with the peripheral direction of the cylindrical member 12 can shut off the flow path at the bias cut portion 12d, thereby preventing fluid leakage through the bias cut portion 12d.

Accordingly, as in the fourth embodiment, forming of the bias cut portion 12d in the stepped shape constituted by a portion parallel with the axial direction of the cylindrical member 12 and the portions parallel with the peripheral direction of the cylindrical member 12 enables an effect that is similar to that of the first embodiment to be obtained. Further, preventing fluid leakage through the bias cut portion 12d is inhibited.

In the fourth embodiment, an example has been described in which the shape of the cylindrical member 12 according to the first embodiment is changed. However, it is also possible to prevent fluid leakage through the bias cut portion 12d by applying the cylindrical member 12 according to the fourth embodiment to a conventional solenoid valve in which a side wall face of the groove portion 11b is chamfered.

Figure 7D:
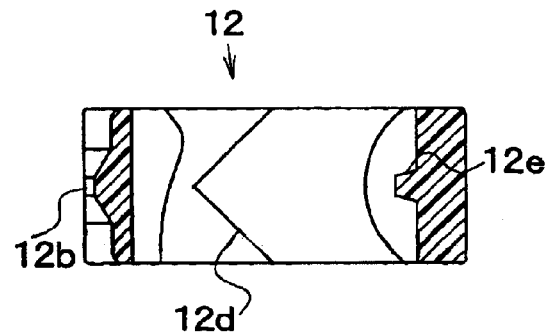
FIG. 7D is a partial cross sectional view of the cylindrical member 12 viewed from the right side of FIG. 7B with a bias cut portion that is different from that shown in FIG. 7C.

Moreover, as shown in FIG. 7D, the bias cut portion 12d which is formed in the cylindrical member 12 may have a wide V-shape such that a direction of the flow path formed by the bias cut portion 12d is changed in middle portion thereof. Since such a configuration is easy to machine and does not easily permit fluid to flow through, it is possible to prevent fluid leakage through the bias cut portion 12d.

Fifth Embodiment

Figure 8:
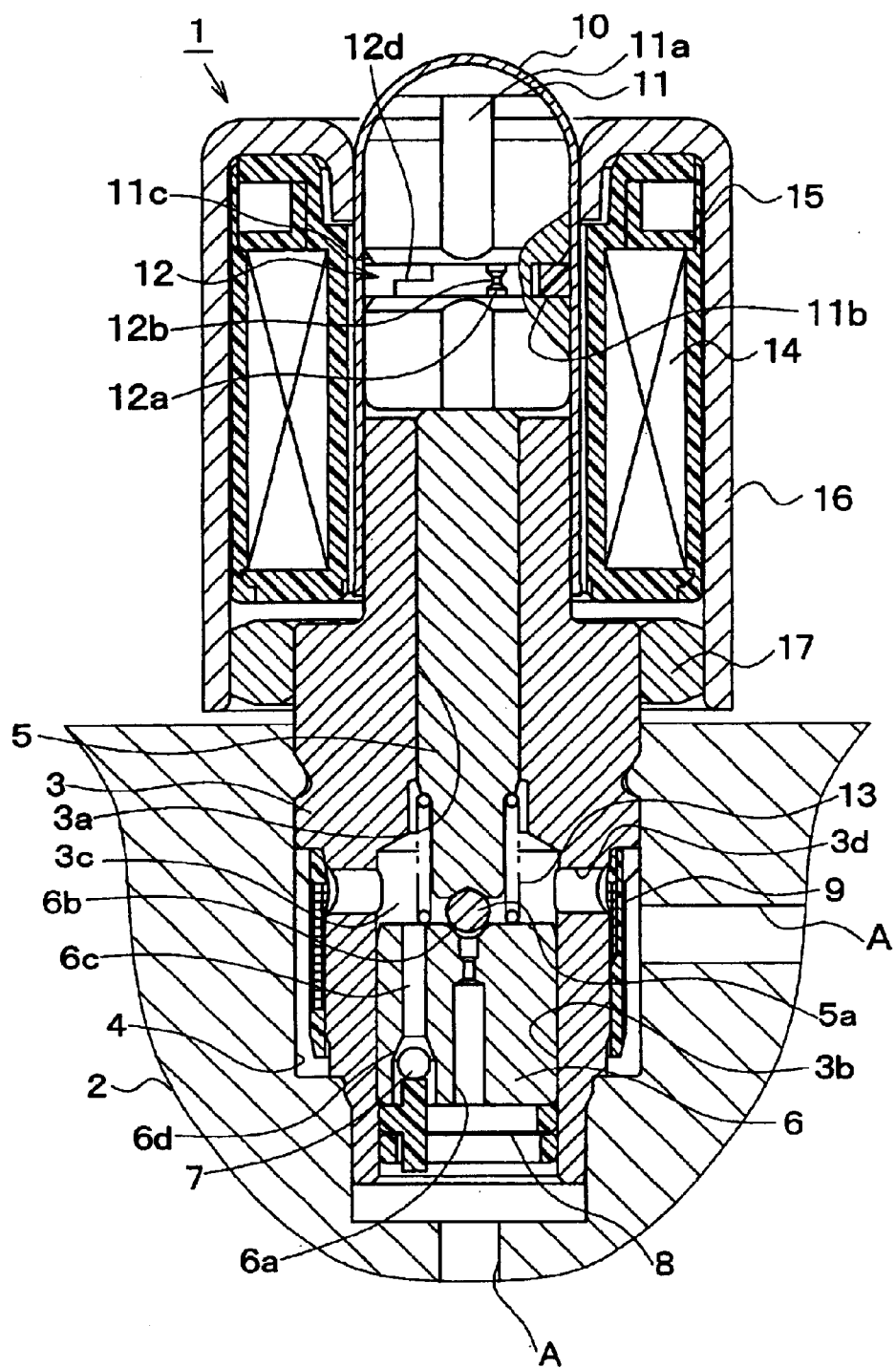
FIG. 8 is a cross sectional view of the solenoid valve 1 according to a fifth embodiment of the present invention.
Figure 9A:
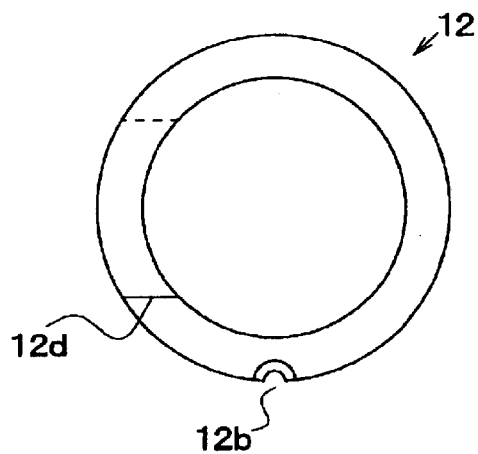
FIG. 9A is a top view of the cylindrical member 12.
Figure 9B:
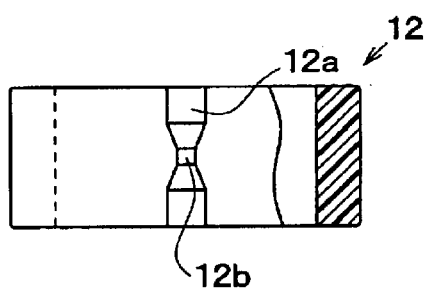
FIG. 9B is a partial sectional view viewed from the front.
Figure 9C:
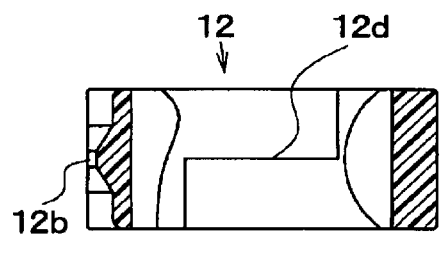
FIG. 9C is a partial sectional view of the cylindrical member 12 viewed from the right side of FIG. 9B.

FIG. 8 is a cross sectional configuration of the solenoid valve 1 according to a fifth embodiment of the present invention. FIG. 9A is a top view of the cylindrical member 12 of FIG. 8. FIG. 9B is a partial cross sectional view of the cylindrical member 12 viewed from the front. FIG. 9C is a partial cross sectional view of the cylindrical member 12 viewed from the right side of FIG. 9B. Since the fifth embodiment only differs from the first embodiment in that the plunger 11 and the cylindrical member 12 are modified. Since other elements of the solenoid valve 1 are the same as in the first embodiment, only a portion which is different will be described.

Unlike the first embodiment in which the cylindrical member 12 is provided with the protruding portions 12c, the cylindrical member 12 according to the fifth embodiment is not provided with protruding portions. If protruding portions are not provided as previously described, there are cases where relative displacement of the orifice 12b of the cylindrical member 12 and the vertical groove 11a of the plunger 11 occurs, and thus the flow path cannot be ensured. To avoid this problem, a chamfered portion 11c is provided such that the side wall face of the groove portion 11b is tapered, and thus fluid can flow through the chamfered portion 11c, thereby ensuring the flow path.

Moreover, according to the first embodiment, the bias cut portion 12d is inclined with respect to the axial direction of the cylindrical member 12. On the contrary, the bias cut portion 12d of the fifth embodiment is formed in a stepped shape configured by portions parallel with the axial direction of the cylindrical member 12 and a portion parallel with the peripheral direction thereof.

Accordingly, even if the cylindrical portion 12 expands in the radial direction, the portion of the bias cut portion 12d that is parallel with the peripheral direction of the cylindrical member 12 can shut off the flow path at the bias cut portion 12d, thereby preventing fluid leakage through the bias cut portion 12d.

Figure 9D:
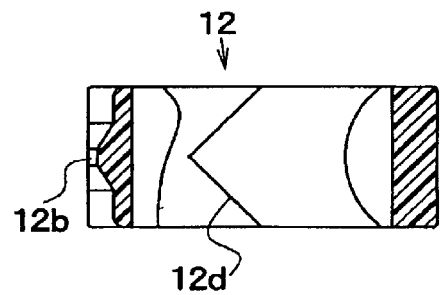
FIG. 9D is a partial sectional view of the cylindrical member 12 according to another modification of the fifth embodiment.

Meanwhile, as shown in FIG. 9D, the bias cut portion 12d which is formed in the cylindrical member 12 may have a wide V-shape such that a direction of the flow path formed by the bias cut portion 12d is changed in middle portion thereof. Since such a configuration is easy to machine, and does not easily permit fluid to flow through, it is possible to prevent fluid leakage through the bias cut portion 12d.

Figure 9E:
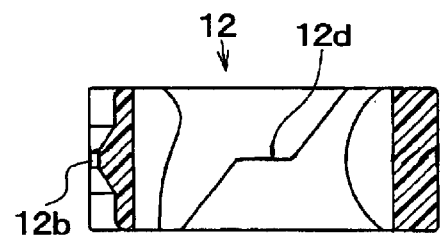
FIG. 9E is a partial sectional view of the cylindrical member 12 according to another modification of the fifth embodiment.
Figure 10:
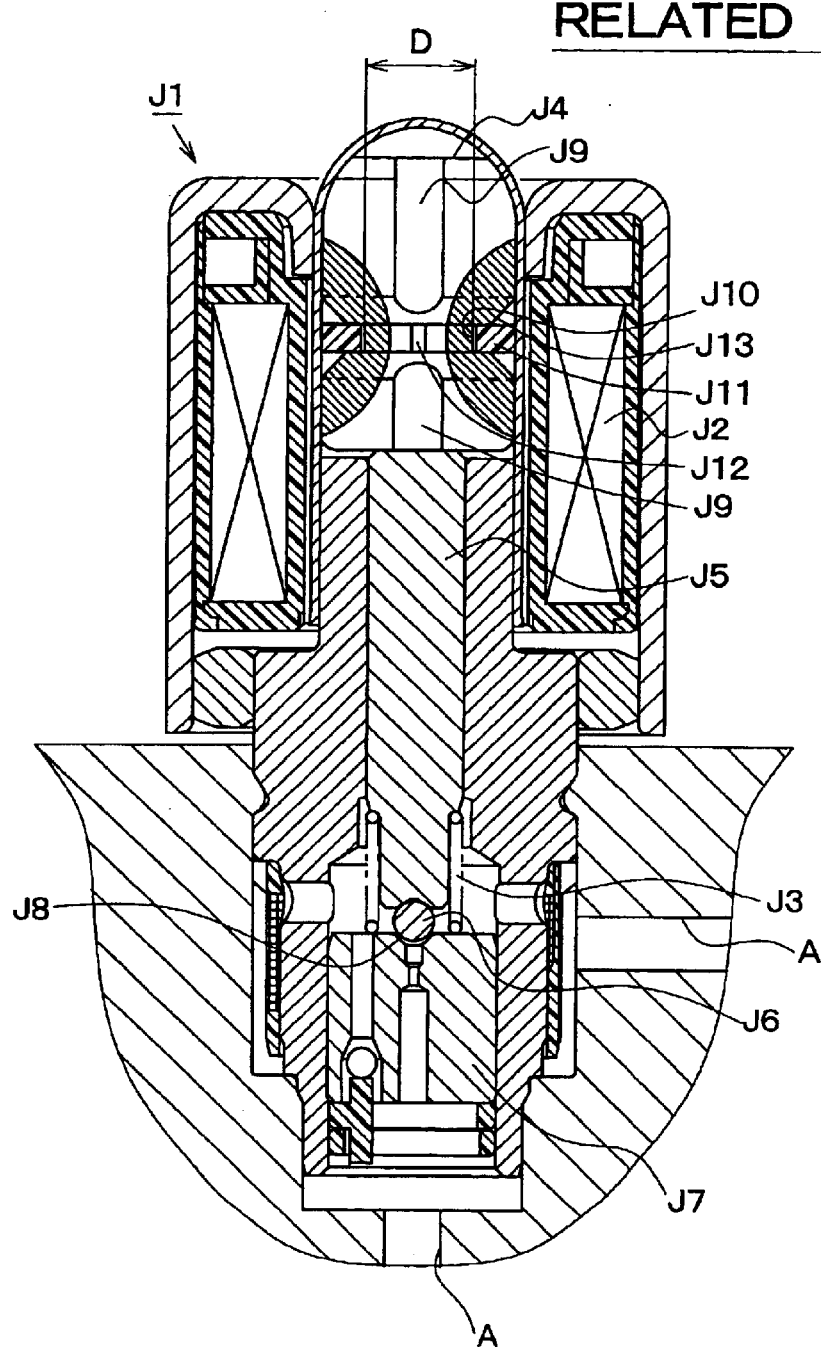
FIG. 10 is a cross sectional view of the related art solenoid valve J1.
Figure 11A:
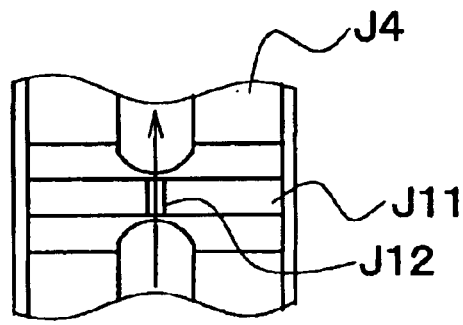
FIG. 11 shows a difference of flow paths when a ring shaped member J11 is displaced.
Figure 11B:
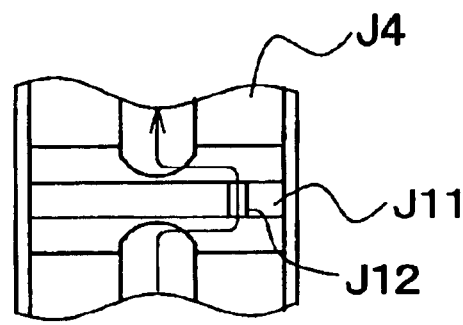

Moreover, as shown in FIG. 9E, the bias cut portion 12d may be a stepped shape configured by portions inclines toward the axial direction of the cylindrical member 12 and a portion parallel with the peripheral direction of the cylindrical member 12.

Accordingly, even if the cylindrical portion 12 expands in the radial direction, the portion of the bias cut portion 12d that is parallel with the peripheral direction of the cylindrical member 12 can shut off the flow path at the bias cut portion 12d, thereby preventing fluid leakage through the bias cut portion 12d.

Modification

As well as the orifice being positioned at the protruding portions 12c that act as the positioning portion, the orifice may be positioned at a position that is 180° around the cylindrical member 12 with respect to the positioning portion. Alternatively, if the plunger 11 is chamfered, the orifice may be positioned at other positions, since a rate of fluid flow that passes along the flow path including the chamfered portion is kept to constant.

While the above description is of the preferred embodiments of the present invention, it should be appreciated that the invention may be modified, altered, or varied without deviating from the scope and fair meaning of the following claims.

What is claimed is:

1. A solenoid valve comprising:
   a sleeve formed in a cup-like shape having a cylindrical portion and a bottom face, with one end side of the sleeve being an opening portion;
   a coil provided on an outer periphery of the sleeve;
   a plunger that is housed in the sleeve and for performing a sliding movement in the sleeve by applying current to the coil, wherein the plunger includes a vertical groove formed on an outer peripheral surface thereof along a sliding direction and a groove portion that is formed on an outer peripheral surface of the plunger around an outer periphery thereof;

a valve body which moves in accordance with the sliding movement of the plunger;

a seat valve having a valve seat which the valve body seats on and separates from, and a communication path that is opened and closed when the valve seat seats on and separates from the valve seat;

a cylindrical member provided with a communication path having an orifice that enables fluid to move in a sliding direction of the plunger is fitted into the groove portion; and a positioning portion restricting movement of the cylindrical member in a peripheral direction of the plunger is provided in at least one of the plunger and the cylindrical member, wherein the cylindrical member is assembled to the plunger such that the positioning portion aligns the vertical groove with the communication path having the orifice.

2. The solenoid valve according to claim 1, wherein the cylindrical member includes a protruding portion that protrudes in an axial direction of the cylindrical member acting as the positioning portion at a portion where the orifice is formed and is fitted into the vertical groove.

3. The solenoid valve according to claim 1, wherein the cylindrical member includes a protruding portion that protrudes in a radial direction of the cylindrical member acting as the positioning portion on an inner peripheral surface thereof, and the plunger has a concave portion provided in the groove portion, into which the protruding portion is fitted.

4. The solenoid valve according to claim 1, wherein the cylindrical member includes a bias cut portion formed by a cut-through portion for cutting itself, and wherein the bias cut portion is formed in a shape that inclines toward with respect to the axial direction of the cylindrical member.

5. The solenoid valve according to claim 1, wherein the cylindrical member includes a bias cut portion formed by a cut-through portion for cutting itself, and wherein the bias cut portion is formed in a stepped shape having a portion that is parallel with a peripheral direction of the cylindrical member.

6. The solenoid valve according to claim 1, wherein the groove portion of the plunger includes a side wall face that is not chamfered.

7. A solenoid valve comprising:

a sleeve formed in a cup-like shape having a cylindrical portion and a bottom face, with one end side of the sleeve being an opening portion;

a coil provided on an outer periphery of the sleeve;

a plunger that is housed in the sleeve and for performing a sliding movement in the sleeve by applying current to the coil, wherein the plunger includes a vertical groove formed on an outer peripheral surface thereof along a sliding direction and a groove portion that is formed on an outer peripheral surface of the plunger around an outer periphery thereof, a valve body which moves in accordance with the sliding movement of the plunger;

a seat valve having a valve seat which the valve body seats on and separates from, and a communication path that is opened and closed when the valve seat seats on and separates from the valve seat; and a cylindrical member provided with a communication path having an orifice that enables fluid to move in a sliding direction of the plunger is fitted into the groove portion, and wherein the cylindrical member includes a bias cut portion formed by a cut-through portion for cutting itself, and wherein the bias cut portion is formed in a stepped shape having a portion that is parallel with a peripheral direction of the cylindrical member.

8. The solenoid valve according to claim 1, wherein the orifice and a portion having a larger flow path area than the orifice are disposed in series along a flow direction of the fluid in the communication path having the orifice.

* * * * *